United States Patent [19]  
Hamburg et al.

[11] 3,848,471  
[45] Nov. 19, 1974

[54] NOISE POLLUTION LEVEL MEASURING CIRCUIT
[75] Inventors: James A. Hamburg, Southfield; Donald R. Whitney, Birmingham, both of Mich.
[73] Assignee: General Motors Corporation, Detroit, Mich.
[22] Filed: Apr. 23, 1973
[21] Appl. No.: 353,446

[52] U.S. Cl. .................................. 73/557, 179/1 N
[51] Int. Cl. .......................... G01h 3/08, G01h 3/10
[58] Field of Search ........ 181/.5 AP, .5 R; 179/1 N; 340/261, 258 D

[56] References Cited
UNITED STATES PATENTS
3,280,937 10/1966 Faber ............................ 181/.5 AP
3,483,941 12/1969 Brady ............................ 181/.5 AP
3,697,973 4/1970 Stevens .......................... 181/.5 AP
3,747,703 7/1973 Knowd ........................... 181/.5 AP Primary Examiner—Benjamin A. Borchelt
Assistant Examiner—J. V. Doramus
Attorney, Agent, or Firm—Warren D. Hill

[57] ABSTRACT

Noise pollution level (NPL) is measured by a circuit according to the formula NPL equals $L_e$ plus 2.5 $\sigma$ where $L_e$ is the mean sound pressure level and $\sigma$ is the standard deviation of the sound pressure level, both quantities being taken over a fixed time interval. The circuit includes a microphone, a circuit connected thereto for providing a sound pressure level, a circuit for integrating the sound pressure level through the fixed time interval to provide the mean sound pressure level, a standard deviation circuit responsive to the sound pressure level signal to determine the standard deviation over the fixed time interval, sample and hold circuits to store the $L_e$ and $\sigma$ signals after the fixed timing interval, a timing circuit to control the time intervals and a circuit for adding the $L_e$ and $\sigma$ signals to produce the NPL output.

5 Claims, 2 Drawing Figures

NOISE POLLUTION LEVEL MEASURING CIRCUIT

This invention relates to a circuit for determining noise pollution level.

It has been proposed by D. W. Robinson of the National Physical Laboratory, U.K., in the NPL Aero Report AC 38, Mar. 1969 to measure the annoyance effects of noise by a concept called noise pollution level. He defines noise pollution level by the formula NPL = $L_{eq} + 2.5\ \sigma$ where $L_{eq}$ is the equivalent continuous energy level of the sound and $\sigma$ is the standard deviation of the level, both of the quantities being measured over a time interval. Noise pollution level has a higher index of correlation with human responses to the annoyance effect of noise than previously used indices. The noise pollution level formula however is not convenient for instrumentation. It has been the practice to tape record noise samples, replay the tape into a statistical distribution analyzer, compute the variable quantities from the analyzer output and then calculate noise pollution level. This is a formidable job where large quantities of data are required. It has been found that an excellent approximation to NPL as defined by Robinson is obtained by redefining the formula as NPL = $L_e + 2.5\ \sigma$ where $L_e$ is the mean sound pressure level and $\sigma$ is the standard deviation of the mean sound level, both quantities being taken over a fixed time interval. In particular as long as the level deviation from the mean is small (less than 10 or 15 dB) the differences between this formula and Robinson's formula are not significant. Further it was found that the new formula for NPL was amendable to instrumentation.

It is therefore a general object of this invention to provide an instrument for the direct measurement of noise pollution level.

The invention is carried out by providing a microphone connected to a circuit for determining the sound pressure level, an integrator for providing the mean sound pressure level, an RMS circuit responsive to the AC component of the sound pressure level to determine the standard deviation of the level and a summing circuit for adding the mean level signal and the standard deviation signal in correct proportions to satisfy the formula NPL = $L_e + 2.5\ \sigma$. Sample and hold circuits receive and store signals for the determined values of $L_e$ and $\sigma$ after each measurement interval. Timing circuitry is provided to update the sample and hold circuits and to reset the integrator and standard deviation circuits at the end of each measurement interval.

The above and other advantages will be made more apparent from the following specification taken in conjunction with the accompanying drawings wherein like reference numerals refer to like parts and wherein.

The term $L_{eq}$ as used in the original NPL equation is extremely difficult to solve by a reasonably simple analogue circuit. Accordingly, a statistical distribution analysis has been required to obtain NPL data. Our discovery that the mean sound pressure level $L_e$ could be substituted for the term $L_{eq}$ to obtain an excellent approximation of NPL has enabled the design of an analogue measuring circuit of relatively simple configuration. Tests of the instrument according to our invention in various noise situations such as busy highways, residential neighborhoods, etc. have revealed an average absolute error of less than 1 dB as compared with results from a statistical distribution analysis of the same noise signals. The NPL instrument is particularly applicable where the sound level has approximately a Gaussian distribution e.g. most traffic noise, or where the level variations are less than 10 or 15 dB. The instrument includes a section responsive to microphone output for determining sound pressure level and circuits responsive to the sound pressure level signal for deriving $L_e$ and $\sigma$ over a five minute time interval and a circuit to combine $L_e$ and $\sigma$ in the proper proportion to obtain an indication of noise pollution level according to the formula NPL = $L_e + 2.5\ \sigma$. A timer circuit establishes the five minute time interval and controls the circuits for obtaining $L_e$ and $\sigma$. Those quantities are sampled and stored at the end of each time interval for display and recording while the measurement circuit is operating in the subsequent time interval. Thus each five minutes a new reading of noise pollution level is obtained. Of course other time intervals may be used if desired.

Figure 1:
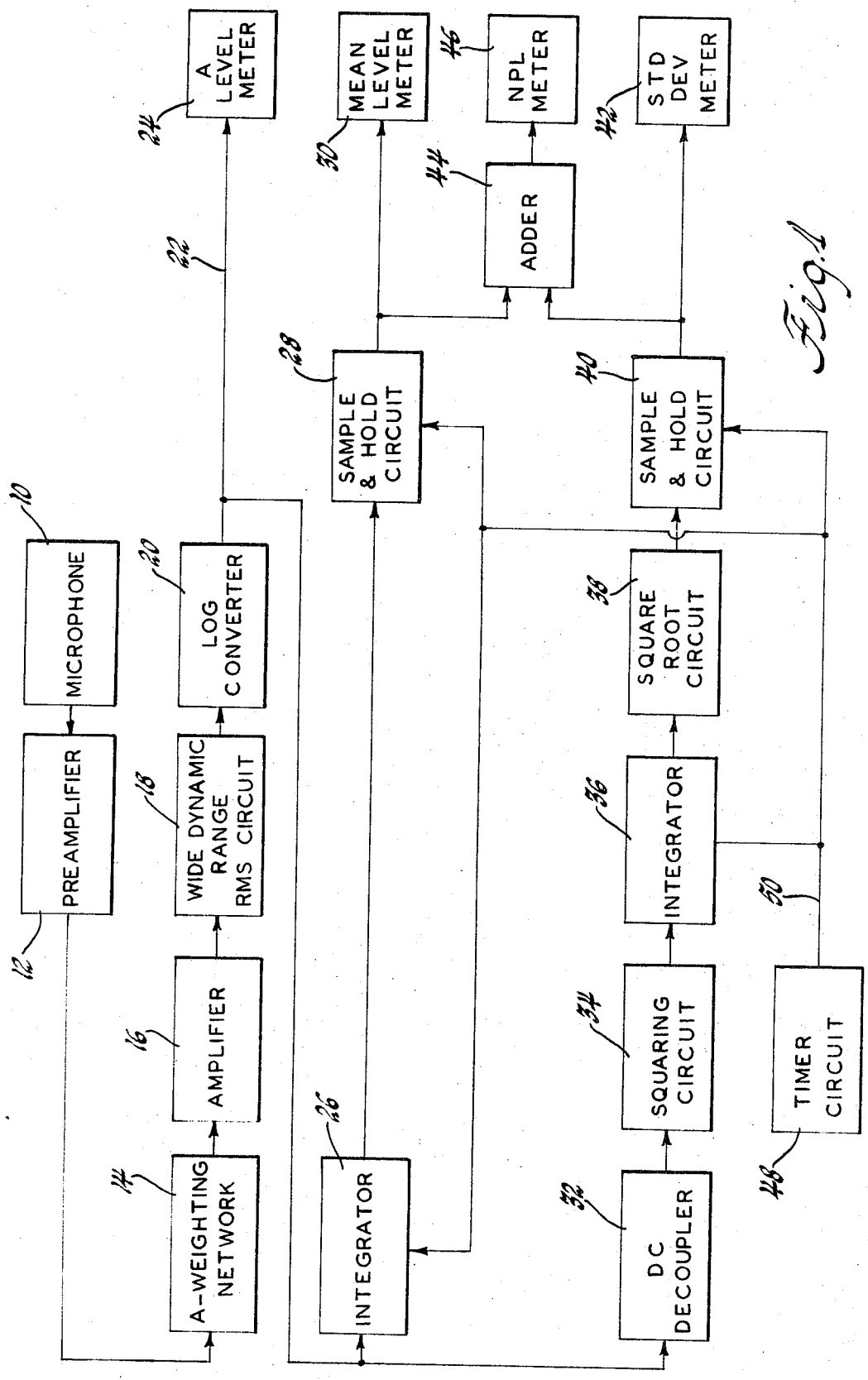
FIG. 1 is a block diagram of the noise pollution level instrument according to the invention.

As shown in FIG. 1 a microphone 10 senses the sound vibrations and converts them into corresponding electrical signals which are amplified to a preamplifier 12 and fed to an A-weighting network 14. While the A-weighting curve is preferred, other desired weighting curves may be utilized. The weighted signal is amplified by an amplifier 16 and fed to a wide dynamic range RMS circuit 18 which has a dynamic range in excess of 60 dB. The resulting signal is then fed to a log converter circuit 20, the output of which on line 22 represents the sound pressure level. The line 22 is connected to a meter 24 calibrated to read 40 to 100 dB — A level. Thus the circuit up to this point can be used as a wide range sound level meter. At this point the sound level signal is split into two paths. The first path leads to an integrator 26 where the instantaneous level is integrated over a fixed measurement period. Following the integrator is a sample and hold circuit 28 which holds the final value of the integrator output from the end of one measurement cycle to the end of the next cycle at which time it is updated to correspond to the new value of the integrator output. The voltage stored by the sample and hold circuit 28, properly scaled, represents the mean sound pressure level over the period of integration and is used as the term $L_e$ in the determination of noise pollution level. This signal is applied to a meter 30 which is calibrated to read 40 to 100 dB mean level.

In the second path the sound level signal on line 22 is fed to a DC decoupler circuit 32 comprising an RC network having a time constant of 5 minutes. By virtue of a capacitor serially connected with line 22, the DC portion of the level signal is removed leaving only the variations in level to be operated upon by the following circuit. By using a time constant equal to the cycle time (5 minutes) long term variations in level are allowed to effect the standard deviation component of the noise pollution level for approximately three 5 minute periods with diminishing effect. Experience has shown that in view of the accuracy of the subject meter, the selection of this particular time constant while somewhat arbitrary is a reasonable choice, however it can easily be changed by appropriate selection of the capacitor to accommodate specific requirements. The level variation signal from the DC decoupler circuit 32 is fed to a squaring circuit 34, an integrating circuit 36 which integrates the signal over the measurement period and then to a square root circuit 38, the output of which represents at the end of a measurement period the root means squared value of the level variations or the standard deviation of the level. Following the square root circuit 38 is a sample and hold circuit 40 which retains the standard deviation output from the end of one measurement cycle to the end of the next cycle when it is updated to the newly measured value of standard deviation. The voltage stored in the sample and hold circuit 40 properly scaled represents 2.5 times the standard deviation of the level over the period of integration and is used as the 2.5 $\sigma$ in the noise pollution level formula. This signal is also applied to a standard deviation meter 42 which is calibrated to read 0 to 10 dB standard deviation. To obtain noise pollution level, the mean sound pressure level $L_e$ from the sample and hold circuit 28 and the standard deviation signal $\sigma$ from the sample and hold circuit 40 are combined in adding circuit 44 according to the formula $NPL = L_e + 2.5\ \sigma$. The resulting voltage is applied to an NPL meter 46 calibrated to read 40 to 140 dB. Each of the 4 meter inputs may be connected to a recording instrument if desired to obtain a permanent record of the several quantities being measured.

A timer circuit 48 establishes the 5 minute measurement periods and controls the NPL circuit accordingly. A control line 50 from the timer circuit 48 is connected to the sample and hold circuits 28 and 40 to update the value stored by those circuits at the end of each 5 minute time interval according to the values attained by the integrator 26 and the square root circuit 38 at that time. Line 50 is also connected to the integrators 26 and 36 to reset the integrators at the end of each five minute period in order to begin a new time interval.

Figure 2:
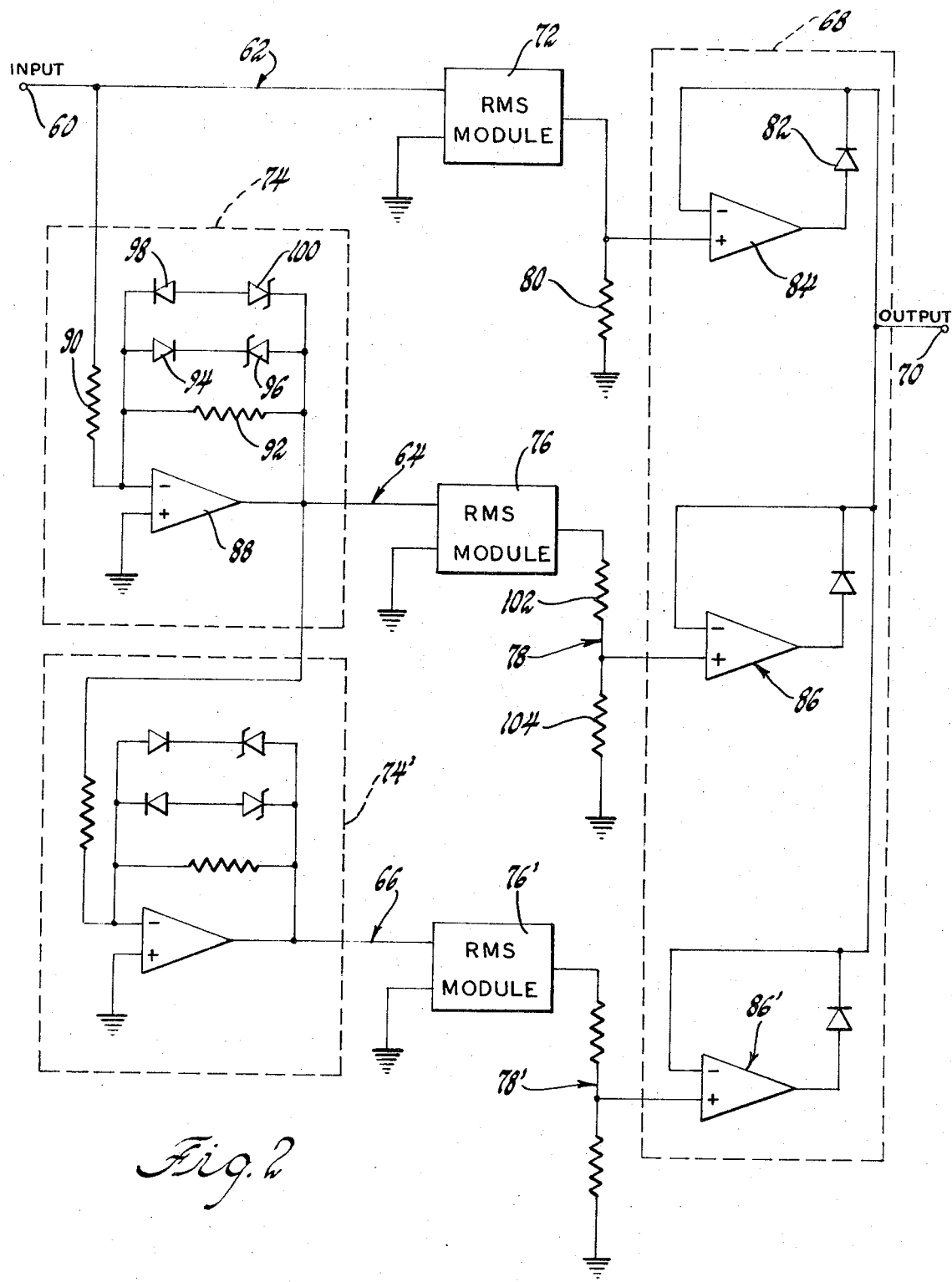
FIG. 2 is a schematic diagram of the wide dynamic range RMS circuit shown in FIG. 1.

All the subcircuits of FIG. 1 with the exception of the wide dynamic range RMS circuit 18 are well known circuits and need not be set forth in further detail. The wide dynamic range RMS circuit 18 however is set forth in FIG. 2. That circuit uses conventional RMS modules having a limited range of only 20 dB arranged in such a manner that a 60 dB dynamic range is obtained with accuracy and requiring no range switching. The circuit comprises an input terminal 60 connected to three parallel paths 62, 64 and 66 leading to a selector circuit 68 which terminates at an output terminal 70. The first path includes an RMS module 72 connected directly between the input terminal 60 and the selector circuit 68. The second path 64 includes an amplifier 74 having a gain of 10, an RMS module 76 in series with an attenuator 78 with an attenuation factor of 10 which is connected to the selector circuit 68. The third parallel path 66 includes in series an amplifier 74' connected to the output of the amplifier 74 also having a gain of 10 to achieve a net gain of 100. That amplifier being in series with an RMS module 76' and an attenuator 78' having an attenuation factor of 100, the attenuator output being connected to the selector circuit 68. The RMS module 72 output is connected to ground through a resistor 80 and to an idealized diode circuit in the selector circuit 68. The idealized diode circuit comprises a diode 82 in the feedback circuit of an operational amplifier 84. A point between the diode and the negative input of the operational amplifier is connected to the output terminal 70 while the positive input is connected to the module 72. This allows the transfer of the module output through the diode 82 without experiencing the diode drop associated with a simple diode. Similar circuits 86 and 86' are used in the selector circuit 68 in the output of the paths 64 and 66. The effect of the selector circuit 68 is to select the output signal from the parallel paths having the largest magnitude and passing that signal to the output 70.

In the path 64 the amplifier 74 comprises an operational amplifier 88 having a grounded positive input terminal and its negative input terminal being connected through a resistor 90 to the input terminal 60. A feedback circuit between the output terminal and the negative input terminal of the operational amplifier 88 includes a feedback resistor 92 in parallel with two diode paths. One of the paths includes a diode 94 and an oppositely poled zener diode 96 and the second diode path includes a diode 98 and a zener diode 100 of opposite polarity to those in the first diode path. The zener diodes are provided to limit the amplifier output to $\pm 10$ volts. The output of the RMS module 76 is connected to the attenuator 78 which is a voltage divider comprising serially connected resistors 102 and 104 with a mid-point connected to the selector circuit 68. In the path 66 the amplifier 74' is identical to the amplifier 74 and the attenuator 78' is the same as the attenuator 78 except for the resistor values which are chosen to provide the attenuation factor of 100.

The characteristics of the RMS modules are substantially identical and are such that they are accurate within the range of 1 to 10 volts input voltages but for input signals outside the accurate range the module output signals are undesirable low. Thus in the high range of signals from 1 to 10 volts at the input terminal 60, the RMS module 72 provides an accurate output to the selector circuit 68. In the second path 64 the input signal is amplified by a factor of 10 up to the limit of 10 volts so that the RMS module 76 output will also be high but it is attenuated by a factor of 10 so that the signal fed to the selector circuit 68 from path 64 will be smaller than that from the first path 62. By similar reasoning, the output from path 66 will be smaller yet. As a specific example, where the signal at the input terminal 60 is 5 volts peak to peak, the output of the path 62 will be 3.54 volts which is the true RMS value for a sine wave. The path 64 however will have an output of 1 volt and the path 66 will have an output of 1/10 volt. In the selector circuit the highest voltage will predominate so that the accurate RMS voltage of 3.54 will be passed to the output terminal 70. In the medium range of input signals from 0.1 to 1 volt, the RMS module 72 will, due to its inherent characteristics, produce a voltage lower than the true RMS value. However, by virtue of the amplifier 74, the RMS module 76 will be operating in its accurate range to provide an accurate RMS signal but for the gain of 10. The attenuator 78 compensates for the gain so that the true RMS value is fed to the selector circuit 68. Again in the path 66 due to the amplifier limits and the large attenuation, a low signal will be fed to the selector circuit 68. Thus the accurate signal from the path 64 will be the largest signal which is passed to the output terminal 70. In a similar manner the path 66 will provide the accurate signal in the range of 0.01 to 0.1 input volts and this will be larger than the signals from the other paths. Accordingly, the wide dynamic range RMS circuit is accurate over a wide range even though the individual RMS components are of limited range. This wide dynamic range circuit is explained in further detail in the copending application of Hamburg (A-17,584).

It will thus be seen that the noise pollution level instrument is accurate and simpler than previously known ways of obtaining NPL measurements and provides a direct readout so that no computations or statistical analyses are required.

The embodiment of the invention described herein is for purposes of illustration and the scope of the invention is intended to be limited only by the following claims:

It is claimed:

1. An instrument for determining noise pollution level (NPL) of sound signals according to the formula $NPL = L_e + 2.5\sigma$ wherein $L_e$ is the mean sound pressure level and $\sigma$ is the standard deviation of the sound pressure level, the quantities $L_e$ and $\sigma$ being taken over a fixed time interval comprising, a circuit responsive to the sound signals to be monitored for providing a first signal representing sound pressure level, an integrator circuit operative through a fixed time interval and responsive to the sound pressure level signal for producing a second signal representing mean sound pressure level, a standard deviation circuit operative through the fixed time interval and responsive to the sound pressure level signal for producing a third signal representing the standard deviation of the sound pressure level and for properly scaling the third signal, circuit means for adding the second and third signals to produce a fourth signal representing noise pollution level, and means for providing a readout of noise pollution level according to the fourth signal.

2. An instrument for determining noise pollution level (NPL) according to the formula $NPL = L_e + 2.5\sigma$ wherein $L_e$ is the mean sound pressure level and $\sigma$ is the standard deviation of the sound pressure level, the quantities $L_e$ and $\sigma$ being taken over a fixed time interval comprising, a microphone sensing the sound to be monitored, a circuit responsive to the output of the microphone for providing a first signal representing sound pressure level, an integrator circuit operative through a fixed time interval and responsive to the sound pressure level signal for producing a second signal representing mean sound pressure level, a standard deviation circuit operative through the fixed time interval and responsive to the sound pressure level signal for producing a third signal representing the standard deviation of the sound pressure level and for properly scaling the third signal, sample and hold circuits responsive to the second and third signals for storing the second and third signal values at the end of each fixed time interval, timing circuit means for establishing each fixed time interval and for updating the sample and hold circuits and resetting the integrator circuit and the standard deviation circuit at the end of each time interval, circuit means for adding the second and third signals to produce a fourth signal representing noise pollution level, and means for providing a readout of noise pollution level according to the fourth signal.

3. An instrument for determining noise pollution level (NPL) according to the formula $NPL = L_e + 2.5\sigma$ wherein $L_e$ is the mean sound pressure level and $\sigma$ is the standard deviation of the sound pressure level, the quantities $L_e$ and $\sigma$ being taken over a fixed time interval comprising, a microphone sensing the sound to be monitored, a circuit responsive to the output of the microphone for providing a first signal representing sound pressure level, an integrator circuit operative through a fixed time interval and responsive to the sound pressure level signal for producing a second signal representing mean sound pressure level, a standard deviation circuit operative through the fixed time interval and responsive to the sound pressure level signal for producing a third signal representing the standard deviation of the sound pressure level and for properly scaling the third signal, the standard deviation circuit comprising a DC decoupler at the input thereof for psssing only the AC component of the sound pressure level signal, and a squaring circuit, an integrator circuit, and a square root circuit serially connected to the DC decoupler for determining the RMS value of the AC component, circuit means for adding the second and third signals to produce a fourth signal representing noise pollution level, and means for providing a readout of noise pollution level according to the fourth signal.

4. An instrument for determining noise pollution level (NPL) according to the formula $NPL = L_e + 2.5\sigma$ wherein $L_e$ is the mean sound pressure level and $\sigma$ is the standard deviation of the sound pressure level, the quantities $L_e$ and $\sigma$ being taken over a fixed time interval comprising, a microphone sensing the sound to be monitored, a circuit responsive to the output of the microphone for providing a first signal representing sound pressure level comprising an A-weighting network, a wide dynamic range RMS circuit, and a log converter circuit in series for determining sound pressure level, an integrator circuit operative through a fixed time interval and responsive to the sound pressure level signal for producing a second signal representing mean sound pressure level, a standard deviation circuit operative through the fixed time interval and responsive to the sound pressure level signal for producing a third signal representing the standard deviation of the sound pressure level and for properly scaling the third signal, sample and hold circuits responsive to the second and third signals for storing the second and third signal values at the end of each fixed time interval, timing circuit means for establishing each fixed time interval and for updating the sample and hold circuits and resetting the integrator circuit and the standard deviation circuit at the end of each time interval, circuit means for adding the second and third signals to produce a fourth signal representing noise pollution level, and means for providing a readout of noise pollution level according to the fourth signal.

5. An instrument for determining noise pollution level (NPL) according to the formula $NPL = L_e + 2.5\sigma$ wherein $L_e$ is the mean sound pressure level and $\sigma$ is the standard deviation of the sound pressure level, the quantities $L_e$ and $\sigma$ being taken over a fixed time interval comprising, a microphone sensing the sound to be monitored, a circuit responsive to the output of the microphone for providing a first signal representing sound pressure level, comprising an A-weighting network, a wide dynamic range RMS circuit, and a log converter circuit in series for determining sound pressure level, an integrator circuit operative through a fixed time interval and responsive to the sound pressure level signal for producing a second signal representing mean sound pressure level, a standard deviation circuit operative through the fixed time interval and responsive to the sound pressure level signal for producing a third signal representing the standard deviation of the sound pressure level and for properly scaling the third signal, the standard deviation circuit comprising a DC decoupler at the input thereof for passing only the AC component of the sound pressure level signal, and a squaring circuit, an integrator circuit, and a square root circuit serially connected to the DC decoupler for determining the RMS value of the AC components, sample and hold circuits responsive to the second and third signals for storing the second and third signal values at the end of each fixed time interval, timing circuit means for establishing each fixed time interval and for updating the sample and hold circuits and resetting the integrator circuit and the standard deviation circuit at the end of each time interval, circuit means for adding the second and third signals to produce a fourth signal representing noise pollution level, and means for providing a readout of noise pollution level according to the fourth signal.

* * * * *